United States Patent [19]
Allen et al.

[11] 3,865,839
[45] Feb. 11, 1975

[54] THIOPYRANOPYRROLYLSALICYCLIC ACIDS AND DERIVATIVES THEREOF

[75] Inventors: Richard C. Allen, Somerville, N.J.; Chandler R. Taylor, Jr., Mechanicsville, Va.

[73] Assignee: American Hoechst Corporation, Bridgewater, N.J.

[22] Filed: Mar. 1, 1973

[21] Appl. No.: 336,920

[52] U.S. Cl.......... 260/326.28, 260/327 R, 424/274
[51] Int. Cl............................................. C07d 27/54
[58] Field of Search.............................. 260/326.28

[56] References Cited
OTHER PUBLICATIONS

Theilheimer, Synthetic Methods of Organic Chemistry, vol. 6 (1952) No. 401.
Theilheimer, Synthetic Methods of Organic Chemistry, vol. 10 (1956), No. 334.

*Primary Examiner*—Joseph A. Narcavage
*Attorney, Agent, or Firm*—Curtis, Morris & Safford

[57] ABSTRACT

Thiopyranopyrrolylsalicylic acids and derivatives thereof having the formula

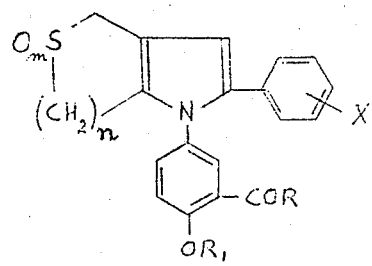

in which X is hydrogen, hydroxy, halogen, alkyl of 1 to 6 carbon atoms, alkoxy of 1 to 6 carbon atoms, phenyl, nitro, amino, trifluoromethyl or cyano, R is hydroxy, alkoxy of 1 to 6 carbon atoms, amino or hydroxylamino, $R_1$ is hydrogen, alkyl of 1 t 6 carbon atoms or alkanoyl of 1 to 6 carbon atoms, m is 0, 1 or 2 and n is 1, 2 or 3 are disclosed to have useful anti-inflammatory and analgesic activity upon administration to mammals.

13 Claims, No Drawings

THIOPYRANOPYRROLYLSALICYCLIC ACIDS AND DERIVATIVES THEREOF

This invention relates to thiopyranopyrrolylsalicylic acids and derivatives thereof of the formula

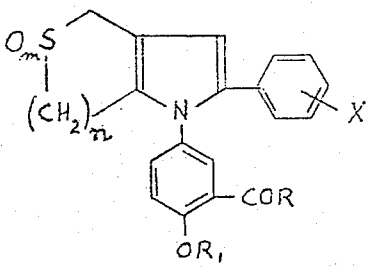

in which X is hydrogen, hydroxy, halogen, alkyl of 1 to 6 carbon atoms, alkoxy of 1 to 6 carbon atoms, phenyl, nitro, amino, trifluoromethyl or cyano, R is hydroxy, alkoxy of 1 to 6 carbon atoms, amino or hydroxylamino, $R_1$ is hydrogen, alkyl of 1 to 6 carbon atoms or alkanoyl of 1 to 6 carbon atoms, $m$ is 0, 1 or 2 and $n$ is 1, 2 or 3, to methods of preparing such compounds, to pharmaceutical compositions containing such compounds as active anti-inflammatory and analgesic agents, and to a method of treatment therewith.

To the best of our knowledge, the compounds of this invention have not heretofore been described. The only thiopyrano[4,3-b]pyrrole known to us, 1,2,3,7-tetrahydro-1-methyl-7,7-diphenyl-4-thiopyrano[4,3-b]pyrrole-4,6-dione, described in Angew. Chemie, Int. Ed. Engl., Vol. 6, pg. 336 (1967) is outside the scope of this invention. The compounds of the present invention are prepared by reaction of an appropriate γ-diketone with 5-aminosalicylic acid or an appropriate derivative thereof according to the reaction scheme

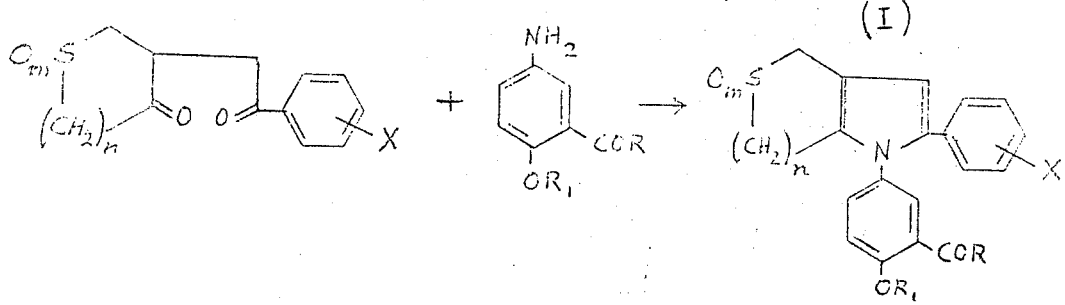

in which X, R, $R_1$, $m$ and $n$ are as defined earlier. In a preferred embodiment of the method of this invention, the reactants are brought into contact with one another for reaction in a solvent inert to the reactants and the reaction product, e.g., acetic acid or ethanol, at a temperature between about 20° and 125°C. for a period of from a few minutes to several days. It will readily be appreciated by those skilled in the art that the time and temperature necessary to complete the reaction are interrelated and dependent upon the structures and compositions of the reaction components and the solvent.

The γ-diketones employed as starting materials are prepared by reaction of an appropriate thiocycloalkanone enamine with an appropriate phenacyl halide in a solvent such as benzene, toluene or dimethylformamide (DMF) for a period of from a few minutes to several days at a temperature between 0° and 150°C., the time and temperature necessary to complete the reaction again being interrelated and dependent upon the structures and compositions of the reaction components and the solvent. The preparation of the γ-diketones is illustrated schematically below, X, $m$ and $n$ being as above and hal being halogen:

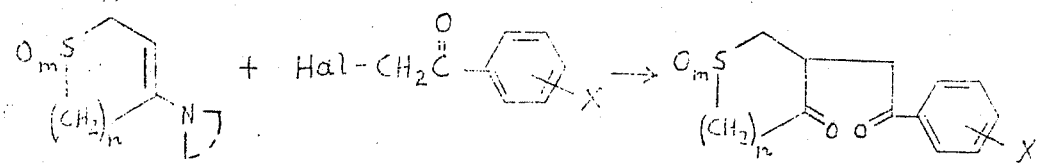

Illustrative examples of the compounds according to the present invention are:

5-(2-phenyl-1,4,6,7-tetrahydrothiopyrano[4,3-b]pyrrol-1-yl)salicylic acid; 5-(2-p-fluorophenyl-1,4,6,7-tetrahydrothiopyrano[4,3-b]pyrrol-1-yl)salicylic acid; 5-(2-m-methoxyphenyl-1,4,6,7-tetrahydrothiopyrano[4,3-b]pyrrol-1-yl)salicylic acid; methyl 5-(2-phenyl-1,4,6,7-tetrahydrothiopyrano[4,3-b]pyrrol-1-yl)salicylate; 5-(2-o-bromophenyl-1,4,6,7-tetrahydrothiopyrano[4,3-b]pyrrol-1-yl)salicylamide; 5-(2-phenyl-4,6-dihydrothieno[3,4-b]pyrrol-1-yl)salicylic acid; and 2-acetoxy-5-(2-phenyl-1,4,6,7-tetrahydrothiopyrano[4,3-b]pyrrol-1-yl)benzoic acid.

Thiopyrano[4,3-b]pyrrol-1-yl)salicylic acids or derivatives of Formula I, wherein X, R, $R_1$ and $n$ have the meaning as defined above and $m$ is 0, can be oxidized to the corresponding sulfoxide or sulfone of Formula I, wherein $m$ is 1 or 2, respectively.

Thiopyrano[4,3-b]pyrrol-1-ylsalicylic acids of Formula I, wherein X, $R_1$, $m$ and $n$ are as defined above and R is hydroxy, can be converted, by standard reactions, to the corresponding esters, amides or hydroxamic acids wherein R is alkoxy of 1 to 6 carbon atoms, amino or hydroxylamino.

Thiopyrano[4,3-b]pyrrol-1-yl)salicylic acids or derivatives of Formula I, wherein X, R, $m$ and $n$ have the meaning as defined above and $R_1$ is hydrogen can be converted by standard reactions to the corresponding ethers or esters wherein $R_1$ is alkyl of 1 to 6 carbon atoms or alkanoyl of 1 to 6 carbon atoms.

The preferred compounds of the present invention are thiopyrano[4,3-b]pyrrol-1-yl)salicylic acids of the formula

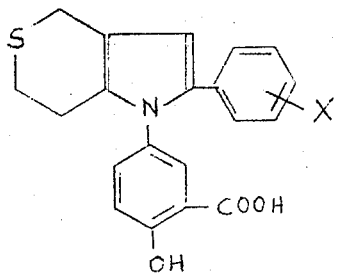

in which X is as defined earlier. Particularly preferred are those compounds in which X is hydrogen, or Cl, Br, F, $CF_3$, $CH_3O$ or phenyl substituted in the meta or para position.

The compounds of the present invention are useful as anti-inflammatory agents due to their ability to suppress inflammation in mammals. The activity of the compounds is demonstrated in the carrageenin-induced rat paw edema anti-inflammatory assay [Proc. Soc. Exptl. Biol. Med., 111, 544 (1962); J. Pharmacol. Exp. Ther. 141,369 (1963)]. For example, at doses of 200 mg/kg of body weight, 5-(2-phenyl-1,4,6,7,-tetrahydrothiopyrano[4,3-b]pyrrol-1-yl)salicylic acid, 5-(2-m-methoxyphenyl-1,4,6,7-tetrahydrothiopyrano[4,3-b]-pyrrol-1-yl)salicylic acid, 5-(2-p-fluorophenyl-1,4,6,7-tetrahydrothiopyrano[4,3-b]pyrrol-1-yl)salicylic acid, and 5-(2-p-methoxyphenyl-1,4,6,7-tetrahydrothiopyrano[4,3-b]pyrrol-1-yl)salicylic acid effect a 66 percent, 34 percent, 64 percent, and 43 percent inhibition of edema, respectively.

5-(2-phenyl-1,4,6,7-tetrahydrothiopyrano[4,3,-b]-pyrrol-1-yl)salicylic acid and 5-(2-p-methoxyphenyl-1,4,-6,7-tetrahydrothiopyrano[4,3-b]pyrrol-1-yl)salicylic acid also exhibit at doses of 37.5 and 50 mg/kg, respectively, an approximately 50 percent inhibition of 2-phenyl-1,4-benzoquinone-induced writhing in mice, a standard assay for analgesia [Proc. Soc. Exptl. Biol. Med., 95, 729 (1957)]. For comparison, aspirin, a known anti-inflammatory and analgesic agent, effects a 53 percent inhibition of edema at a dose of 128 mg/kg and a 34 percent inhibition of 2-phenyl-1,4-benzoquinone-induced writhing at a dose of 60 mg/kg. These data illustrate that the thiopyranopyrrolylsalicylic acids and related compounds of this invention are useful for the suppression of inflammation and pain in mammals when administered in amounts ranging from 1 to about 200 mg per kg of body weight per day.

The compounds of the present invention may be administered by any convenient route such as orally, intramuscularly, intravenously, subcutaneously, or intraperitoneally. The preferred route of administration is oral, for example, with an inert diluent or with an edible carrier or in gelatin capsules or tablets. For the purpose of oral therapeutic administration, the active compounds of this invention may be incorporated with excipients and used in the form of tablets, troches, capsules, elixirs, suspensions, syrups, wafers, chewing gum, and the like. These preparations should contain at least 0.5 percent of active compound, but may be varied depending upon the particular form and may conveniently be between 7 percent to about 70 percent of the weight of the unit. The amount of active compound in such compositions is such that a suitable dosage will be obtained. Preferred compositions and preparations according to the present invention are prepared so that an oral dosage unit form contains between 10 and 200 milligrams of active compound.

The tablets, pills, capsules, troches, and the like may also contain the following ingredients: a binder such as gum tragacanth or gelatin; an excipient such as starch or lactose, a disintegrating agent such as alginic acid, potato starch and the like; a lubricant such as magnesium stearate; and a sweetening agent such as sucrose or saccharin may be added or a flavoring agent such as peppermint, methylsalicylate, or orange flavoring. When the dosage unit form is a capsule, it may contain, in addition to materials of the above type, a liquid carrier such as fatty oil. Other dosage unit forms may contain other various materials which modify the physical form of the dosage unit, for example, as coatings. Thus, tablets or pills may be coated with sugar, shellac, or both. A syrup may contain, in addition to the active compounds, sucrose as a sweetening agent, and certain preservatives, dyes and colorings, and flavors. Materials used in preparing these various compositions must be pharmaceutically pure and non-toxic in the amounts utilized.

The invention is further illustrated by the following examples.

EXAMPLE 1 a. 5,6-Dihydro-4-(1-pyrrolidinyl)-2H-thiopyran:

A solution of 103 g (0.9 mol) of tetrahydrothiopyran-4-one, 95 g (1.33 mol) of pyrrolidine, and 1 l. of anhydrous benzene was heated under reflux in a nitrogen atmosphere for 2 hrs. until the theoretical amount of water was collected in a water trap. The solvent was distilled and the residue fractionated under reduced pressure to provide 105 g of colorless liquid, b.p. 124°C. at 0.01 mm.

b. 3-Phenacyl-2,3,5,6-tetrahydrothiopyran-4-one:

A solution of 56.3 g (0.28 mol) of phenacyl bromide in 100 ml of DMF was added, in the course of 20 minutes and under a nitrogen atmosphere, to a cooled, stirred solution of 41.6 g (0.28 mol) of 5,6-dihydro-4-(1-pyrrolidinyl)-2H-thiopyran in 300 ml of anhydrous DMF. After two hours, the solution was diluted with water and extracted with chloroform; the chloroform extracts were washed with water, dried and concentrated. Crystallization from ethanol gave 43 g of solid; m.p. 101.5°– 103.5°C.

c. 5-(2-Phenyl-1,4,6,7-tetrahydrothiopyrano[4,3-b]pyrrol-1-yl)salicylic acid:

A stirred suspension of 13.7 g (0.06 mol) of 3-phenacyl-2,3,5,6-tetrahydrothiopyran-4-one, 9.0 g (0.06 mol) of 5-aminosalicylic acid, and 60 ml of glacial acetic acid was refluxed under a nitrogen atmosphere for 1 ¾ hours. The reaction mixture was cooled to room temperature and the solid removed by filtration. Recrystallization from acetic acid and acetonitrile yielded 10.4 g (50 percent) of crystals; m.p. 220°–225.5°C. (dec.).

| | |
|---|---|
| Calc. for $C_{20}H_{17}NO_3S$: | 68.35% C; 4.88% H; 3.99% N; |
| Found: | 68.03% C; 4.83% H; 4.38% N. |

EXAMPLE 2 a. 3-(p-Bromophenacyl)-2,3,5,6-tetrahydrothiopyran-4-one:

A suspension of 41.7 g (0.15 mol) of p-bromophenacyl bromide in 50 ml of DMF was added dropwise under nitrogen to a cooled stirred solution of 25.4 g (0.15 mol) of 5,6-dihydro-4-(1-pyrrolidinyl)-2H-thiopyran in 150 ml of anhydrous DMF. The mixture was stirred at room temperature for 16 hrs., diluted with water and extracted with chloroform. The chloroform solution was dried and concentrated, and the residue was chromatographed on silica gel with a 1:1 benzene-chloroform mixture as eluent. 24.1 g of a solid was obtained. Recrystallization from ethanol provided 19.8 g. of crystals, m.p. 87.5° – 89.5°C.

b. 5-(2-p-Bromophenyl-1,4,6,7-tetrahydrothiopyrano[4,3-b]-pyrrol-1-yl)salicylic acid:

A stirred suspension of 4.0 g (0.013 mol) of 3-(p-bromophenacyl)-2,3,5,6-tetrahydrothiopyran-4-one and 1.95 g (0.013 mol) of 5-aminosalicylic acid in 15 ml of glacial acetic acid was heated to reflux under nitrogen for one hour, cooled and filtered to provide 5.2 g (94 percent of crystals, m.p. 260° – 262°C. (dec.).

| | |
|---|---|
| Calc. for $C_{20}H_{16}BrNO_3S$: | 55.82% C; 3.75% H; 3.26% N; |
| Found: | 55.78% C; 3.78% H; 3.16% N. |

EXAMPLE 3 a. 3-(p-Flurophenacyl)-2,3,5,6-tetrahydropyran-4-one:

To a cooled, stirred solution of 16.9 g (0.1 mol) of 5,6-dihydro-4-(1-pyrrolidinyl)-2H-thiopyran in 100 ml. of anhydrous DMF was added, in the course of 40 minutes and under nitrogen, a solution of 21.7 g (0.1 mol) of α-bromo-p-fluoroacetophenone in 50 ml of DMF. After 6 hrs. at room temperature, the mixture was worked up as described in Example 1a. Yield 10.6 g of crystals; m.p. 111.5° – 113.5°C.

b. 5-(2-p-Fluorophenyl-1,4,6,7-tetrahydrothiopyrano[4,3-b]-pyrrol-1-yl)salicylic acid.

5.0 g (0.02 mol) of 3-(p-fluorophenacyl)-2,3,5,6-tetrahydropyran-4-one and 3.0 g (0.02 mol) of 5-aminosalicylic acid in 20 ml. of glacial acetic acid were reacted as described in Example 2b for one-half hour, cooled and filtered to provide 6.6 g (90 percent) of crystals. After recrystallization from ethanol, m.p. 240°–243°C.(dec.).

| | |
|---|---|
| Calc. for $C_{20}H_{16}FNO_3S$: | 65.03% C; 4.37% H; 3.79% N; |
| Found: | 64.88% C; 4.43% H; 3.67% N. |

EXAMPLE 4 a. 3-(p-Methoxyphenacyl)-2,3,5,6-tetrahydrothiopyran-4-one:

16.9 g (0.1 mol) of 5,6-dihydro-4-(1-pyrrolidinyl)-2H-thiopyran dissolved in 100 ml. of anhydrous DMF and 23.2 g (0.1 mol) of α-bromo-p-methoxyacetophenone in 50 ml. of DMF were reacted as described in Example 3a and the reaction mixture was worked up as described in Example 1a. After crystallization of the crude product from methanol and then from acetic acid, m.p. 123° –125°C.

b. 5-(2-p-Methoxyphenyl-1,4,6,7-tetrahydrothiopyrano[4,3-b]-pyrrol-1-yl)salicylic acid:

5.0 g (0.02 mol) of 3-(p-methoxyphenacyl)-2,3,5,6-tetrahydrothiopyran-4-one and 2.9 g (0.02 mol) of 50 aminosalicylic acid in 25 ml. of glacial acetic acid were reacted as described in Example 2b for two hours, the suspension was filtered while hot and the filtrate was cooled and again filtered to provide 6.1 g of solid. After recrystallization from acetonitrile, m.p. 210°–212°C. (dec.).

| | |
|---|---|
| Calc. for $C_{21}H_{19}NO_4S$: | 66.12% C; 5.02% H; 3.67% N; |
| Found: | 66.02% C; 5.10% H; 3.99% N. |

EXAMPLE 5 a. 3-(p-Chlorophenacyl)-2,3,5,6-tetrahydrothiopyran-4-one:

16.9 g (0.1 mol) of 5,6-dihydro-4-(1-pyrrolidinyl)-2H-thiopyran dissolved in 100 ml. of anhydrous DMF and 23.4 g (0.1 mol) of α-bromo-p-chloroacetophenone in 50 ml. of DMF were reacted as described in Example 3a and the reaction mixture was worked up as described in Example 2a. Recrystallization from ethanol provided 12.2 g of crystals; m.p. 78° – 81°C.

b. 5-(2-p-Chlorophenyl-1,4,6,7-tetrahydrothiopyrano[4,3-b]-pyrrol-1-yl)salicylic acid:

5.0 g (0.02 mol) of 3-(p-chlorophenacyl)-2,3,5,6-tetrahydrothiopyrano-4-one and 2.9 g (0.02 mol) of 5-aminosalicylic acid in 20 ml. of glacial acetic acid were reacted as described in Example 2b for ¾ hrs., cooled and filtered to provide 5.3 g of crystals. After recrystallization from acetic acid, m.p. 250° – 253°C. (dec.).

| | |
|---|---|
| Calc. for $C_{20}H_{16}ClNO_3S$: | 62.25% C; 4.8% H; 3.63% N; |
| Found: | 61.93% C; 4.39% H; 3.51% N. |

EXAMPLE 6 a. 3-(m-Trifluoromethylphenacyl)-2,3,5,6-tetrahydrothiopyran-4-one:

20 g (0.12 mol) of 5,6-dihydro-4-(1-pyrrolidinyl)-2H-thiopyran dissolved in 120 ml. of anhydrous DMF and 32.6 g (0.12 mol) of α-bromo-m-trifluoromethylacetophenone in 10 ml. of DMF were reacted as described in Example 3a for two hrs. and the reaction mixture was worked up as described in Example 2a. 11.7 g of an oily product was obtained. IR and NMR spectra were consistent with the assigned structure.

b. 5-(2-m-Trifluoromethylphenyl-1,4,6,7-tetrahydrothiopyrano-[4,3-b]pyrrol-1-yl)salicylic acid:

5.0 g (0.017 mol) of 3-(m-trifluoromethylphenacyl)-2,3,5,6-tetrahydrothiopyran-4-one and 2.53 g (0.017 mol) of 5-aminosalicylic acid in 20 ml. of glacial acetic acid were reacted as described in Example 2b and worked up as described in Example 4b to provide 4.0 g (58 percent) of crystals. After recrystallization from acetonitrile, m.p. 223.5° – 226°C. (dec.).

| Calc. for $C_{21}H_{16}F_3NO_3S$: | 60.14% C; 3.85% H; 3.34% N; |
|---|---|
| Found: | 59.84% C; 3.90% H; 3.61% N. |

EXAMPLE 7 a. 3-(m-Methoxyphenacyl)-2,3,5,6-tetrahydrothiopyran-4-one:

16.9 g (0.1 mol) of 5,6-dihydro-4-(1-pyrrolidinyl)-2H-thiopyran in 100 ml. of anhydrous DMF and 22.9 g (0.1 mol) of α-bromo-m-methoxyacetophenone in 50 ml. of DMF were reacted as described in Example 3a for three hrs. and the reaction mixture was worked up as described in Example 2a. Recrystallization from ethyl acetate provided 10.8 g of crystals; m.p. 63° –66°C.

b. 5-(2-m-Methoxy-1,4,6,7-tetrahydrothiopyrano[4,3-b]pyrrol-1-yl)salicylic acid:

4.0 g (0.015 mol) of 3-(m-methoxyphenacyl-2,3,5,6-tetrahydrothiopyran-4-one and 2.3 g (0.015 mol) of 5-aminosalicylic acid in 15 ml. of glacial acetic acid were reacted as described in Example 2b for three hrs. and filtered. The filtrate were cooled, stirred for one hr. and again filtered. 5.4 g of solids were obtained. After repeated recrystallization from ethyl acetate, pale yellow crystals were obtained; m.p. 214°–215.5° (dec.).

| Calc. for $C_{21}H_{19}NO_4S$: | 66.12% C; 5.02% H; 3.67% N; |
|---|---|
| Found: | 66.07% C; 5.08% H; 3.65% N. |

EXAMPLE 8 a. 3-(p-Phenylphenacyl)-2,3,5,6-tetrahydropyran-4-one:

4.75 g (0.03 mol) of 5,6-dihydro-4-(1-pyrrolidinyl)-2H-thiopyran in 30 ml. of anhydrous DMF and 7.7 g (0.03 mol) of α-bromo-p-phenylacetophenone in 30 ml. of DMF were reacted as described in Example 3a and the reaction mixture was worked up as described in Example 2a to provide 7.2 g of crystals. After recrystallization from methanol and acetic acid, m.p. 142° 14 144°C.

b. 5-(2-p-Biphenylyl-1,4,6,7-tetrahydrothiopyrano[4,3-b]pyrrol-1-yl)salicylic acid:

3.5 g (0.01 mol) of 3-(p-phenylphenacyl)-2,3,5,6-tetrahydropyran-4-one, 1.72 g (0.01 mol) of 5-aminosalicylic acid and 15 ml. of glacial acetic acid were heated under reflux under nitrogen for three hours, filtered, cooled and filtered again to provide 3 g of product which was chromatographed on silica gel with a chloroform-methanol mixture and recrystallized from acetonitrile to give 1.5 g of crystals, m.p. 230° – 239°C.

| Calc. for $C_{26}H_{21}NO_3S\cdot 1/2CH_3CN$: | 72.38% C; 5.06% H; 4.69% N; |
|---|---|
| Found: | 71.99% C; 5.07% H; 4.70% N. |

EXAMPLE 9 a. 5,6-Dihydro-4-(1-pyrrolidinyl)-2H-thiopyran-1,1-dioxide:

A mixture of 18.0 g (0.12 mol) of tetrahydrothiopyran-4-one-1,1-dioxide, 13.0 g (0.18 mol) of pyrrolidine, 50 g of 5A molecular sieves, and 400 ml. of anhydrous benzene was shaken for 3.5 hrs. and filtered. The filtrate was concentrated under pressure to a gummy solid.

b. 3-phenacyl-2,3,5,6-tetrahydrothiopyran-4-one-1,1-dioxide:

23.0 g (0.11 mol) of 5,6-dihydro-4-(1-pyrrolidinyl)-2H-thiopyran-1,1-dioxide in 100 ml. of anhydrous DMF and 22.8 g (0.11 mol) of phenacyl bromide were reacted as described in Example 3a for 18 hrs. and the reaction mixture was worked up as described in Example 2a, the eluent being a 99:1 benzene-methanol mixture. The crude solid was recrystallized from methanol to give colorless crystals, m.p. 157.5°–159°C.

c. 5-(5,5-Dioxo-2-phenyl-1,4,6,7-tetrahydrothiopyrano[4,3-b]-pyrrol-1-yl)salicylic acid:

4.0 g (0.015 mol) of 3-pheacyl-2,3,5,6-tetrahydrothiopyran-4-one-1,1-dioxide and 2.3 g (0.015 mol) of 5-aminosalicylic acid in 15 ml. of glacial acetic acid were reacted as described in Example 2b for 1.5 hrs. and filtered to provide 5.3 g (92 percent) of an off-white solid. Recrystallization from 1-butanol gave colorless crystals, m.p. 283°C. (dec.).

| Calc. for $C_{20}H_{17}NO_5S$: | 62.65% C; 4.47% H; 3.65% N; |
|---|---|
| Found: | 62.80% C; 4.72% H; 3.55% N. |

EXAMPLE 10

5-(5-Oxo-2-phenyl-1,4,6,7-tetrahydrothiopyrano[4,3-b]pyrrol-1-yl)salicylic acid:

To a cold (0°C) stirred solution of 7.5 g (0.02 mol) of 5-(2-phenyl-1,4,6,7-tetrahydrothiopyrano-[4,3-b]pyrrol-1-yl)salicylic acid (prepared according to Example 1c) and 375 ml. of ethanol was added, under nitrogen, a solution of 4.55 g (0.02 mol) of sodium metaperiodate in 100 ml. of water. The mixture was stirred for 18 hrs., diluted with chloroform, and filtered. The layers were separated and the organic phase was washed with water, dried and concentrated to a solid. Two recrystallizations from methanol provided 2.4 g of crystals, m.p. 199° – 201.5°C (dec.).

| Calc. for $C_{20}H_{17}NO_4S$: | 64.78% C; 4.83% H; 3.73% N; |
|---|---|
| Found: | 64.74% C; 4.75% H; 4.12% N. |

We claim:
1. A compound of the formula

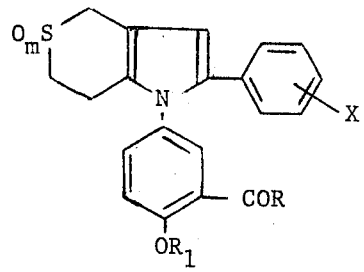

in which X is hydrogen, hydroxy, halogen, alkyl of 1 to 6 carbon atoms, alkoxy of 1 to 6 carbon atoms, phenyl, nitro, amino, trifluoromethyl or cyano, R is hydroxy, alkoxy of 1 to 6 carbon atoms or amino, $R_1$ is hydrogen, alkyl of 1 to 6 carbon atoms or alkanoyl of 1 to 6 carbon atoms, and m is 0, 1 or 2.

2. A compound as defined in claim 1 of the formula

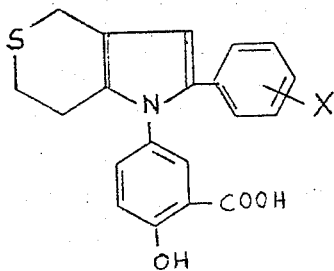

wherein X has the meaning defined in claim 1.

3. A compound as defined in claim 2 wherein X is hydrogen, fluoro, chloro, bromo, methoxy, trifluoromethyl or phenyl.

4. The compound defined in claim 3 wherein X is hydrogen.

5. The compound defined in claim 3 wherein X is p-bromine.

6. The compound defined in claim 3 wherein X is p-fluorine.

7. The compound defined in claim 3 wherein X is p-chlorine.

8. The compound defined in claim 3 wherein X is p-methoxy.

9. The compound defined in claim 3 wherein X is m-methoxy.

10. The compound defined in claim 3 wherein X is p-trifluoromethyl.

11. The compound defined in claim 3 wherein X is p-phenyl.

12. The compound defined in claim 1 wherein X is hydrogen, R is hydroxy, $R_1$ is hydrogen and $m$ is 2.

13. The compound defined in claim 1 wherein X is hydrogen, R is hydroxy, $R_1$ is hydrogen and $m$ is 1.

* * * * *

UNITED STATES PATENT OFFICE
CERTIFICATE OF CORRECTION

PATENT NO. : 3,865,839
DATED : February 11, 1975
INVENTOR(S) : Allen et al.

It is certified that error appears in the above-identified patent and that said Letters Patent are hereby corrected as shown below:

In the Abstract:
        Line 5 after the structural formula, "1 t 6" should read -- 1 to 6 --;
        Column 7, lines 51 to 52, "142° 14 144°C." should read -- 142° - 144°C. --

Signed and sealed this 29th day of April 1975.

(SEAL)
Attest:

RUTH C. MASON
Attesting Officer

C. MARSHALL DANN
Commissioner of Patents
and Trademarks